United States Patent [19]

Komatsu

[11] Patent Number: 5,273,229
[45] Date of Patent: * Dec. 28, 1993

[54] FIXED TORQUE SPRING CLUTCH

[76] Inventor: Fumito Komatsu, 1632-12, Nomura, Oaza Hirooka, Shiojiri-shi, Nagano-ken, Japan

[*] Notice: The portion of the term of this patent subsequent to Nov. 12, 2008 has been disclaimed.

[21] Appl. No.: 711,187

[22] Filed: Jun. 5, 1991

[30] Foreign Application Priority Data

Oct. 2, 1990 [JP] Japan .................. 2-265893

[51] Int. Cl.⁵ .................... B65H 16/10; G11B 15/32; F16D 11/06
[52] U.S. Cl. ................ 242/67.10 R; 242/201; 242/68.3; 192/41 S; 192/81 C
[58] Field of Search ............ 242/67.1 R, 200, 201; 464/57, 58, 60; 192/26, 41 S, 81 C

[56] References Cited

U.S. PATENT DOCUMENTS

| | | | |
|---|---|---|---|
| 2,723,013 | 11/1955 | Rogers et al. | 192/41 S |
| 2,833,383 | 5/1958 | Christensen | 192/41 S X |
| 2,922,220 | 1/1960 | Sacchini | 192/41 S |
| 2,928,514 | 3/1960 | Clausing et al. | 192/41 S |
| 3,442,359 | 5/1969 | Atchison | 192/41 S X |
| 3,844,390 | 10/1974 | Lowery | 192/26 |
| 3,850,275 | 11/1974 | Helander | 192/26 |
| 3,893,554 | 7/1975 | Wason | 192/41 S X |
| 4,133,497 | 1/1979 | Rothlisberger | 242/201 X |
| 4,527,683 | 7/1985 | Mathews | 192/41 S X |
| 4,709,871 | 12/1987 | Tanaka et al. | 242/201 X |
| 4,760,903 | 8/1988 | Stegelmeier et al. | 192/26 |
| 4,830,151 | 5/1989 | Numata | 192/41 S X |
| 5,064,038 | 11/1991 | Batchelder | 192/41 S |
| 5,064,137 | 11/1991 | Komatsu | 242/68.3 X |

Primary Examiner—Daniel P. Stodola
Assistant Examiner—John P. Darling
Attorney, Agent, or Firm—Jordan and Hamburg

[57] ABSTRACT

A fixed torque spring clutch has first and second rotors. The torque of the first rotor is transmitted to the second rotor via a coil spring. The second rotor is coaxial with the first rotor. A shaft section is provided on one of the rotors. A plurality of catch sections are provided on the other rotor. The coil spring is mounted over the shaft section. The two ends of the coil spring are caught by the catch sections in a clamping state of the clutch. The coil spring has a first clamping section for clamping the shaft section with a predetermined clamping force when the coil spring is mounted over the shaft section, and a second clamping section having a clearance with respect to the corresponding part of the shaft section when the coil spring is mounted thereon.

16 Claims, 5 Drawing Sheets

FIXED TORQUE SPRING CLUTCH

BACKGROUND OF THE INVENTION

The present invention relates to a fixed torque spring clutch which is inexpensive, in capable of transmitting very constant torque and has a long life.

The inventor has developed a fixed spring clutch (see FIG. 10) and filed in The U.S. Patent And Trademark Office as follows:

| | |
|---|---|
| Application number: | 07/516,595 |
| Application date: | April 30, 1990 |
| Title: | A FIXED TORQUE SPRING CLUTCH AND A WINDER HAVING THE SAME |
| Inventor: | Fumito KOMATSU |

Figure 10:
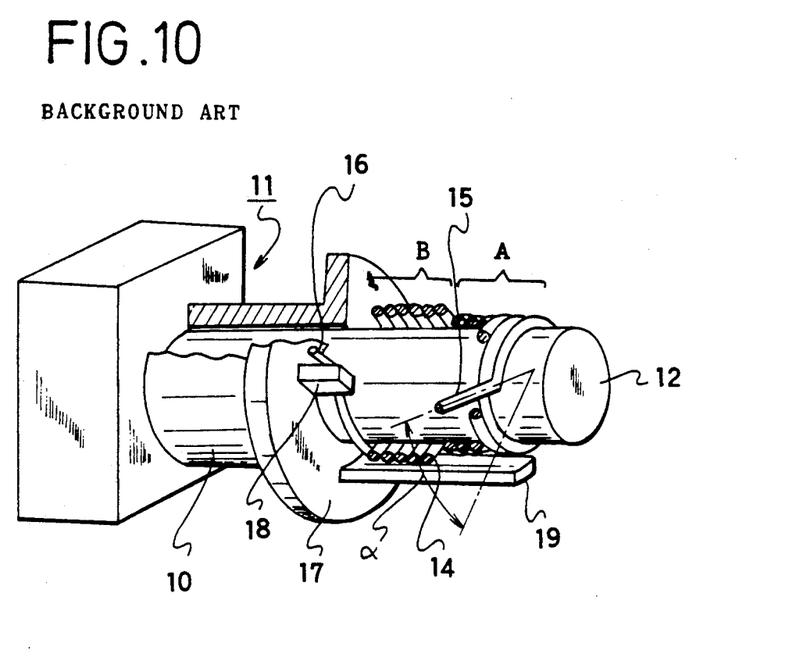
FIG. 10 is a perspective view, with portions broken away for clarity, of a conventional fixed torque spring clutch.

The spring clutch shown in FIG. 10 has a coil spring 14. The coil spring 14 consists of a first clamping section A and a second clamping section B. The first clamping section A of the coil spring 14 is wound around a shaft section 12 of a second rotor 11. There is formed an engage piece 16 at the end of the second clamping section B. The engage piece 16 contacts a limit piece 18 provided in a flange section 17 of a first rotor 10. There is provided a release piece 19 in the first rotor 10. The release piece 19 deviates away from the limit piece 18 at an angle $\alpha$. The release piece 19 rotates in the direction of loosening the first clamping section A so as to contact an engage section, which is formed at the end of the first clamping section A.

By rotating either the first rotor 10 or the second rotor 11 in the prescribed direction with respect to the other, the first clamping section A of the coil spring 14 winds around the shaft section 12. The end of the second clamping section B is caught by the limit piece 18, so that the torque of the second clamping section B rises in accordance with the spring characteristics. When the release piece 19 contacts the first clamping section A, the first clamping section A is loosened. In spite of loosening the clamping section A, the torque of the second clamping section B continues to rise while the clamping force of the first clamping section A remains greater than the torque of the second clamping section B. When the clamping force of the first clamping section A and the torque of the second clamping section B are balanced, the first clamping section A then slips on the shaft section 12, so that the torque is stabilized.

The total torque is primarily affected by the torque of the second clamping section B; the torque of the first clamping section A is relatively small. Variations in torque among the clutches of the present invention are minimized, therefore, in spite of any differences in diameter of the first clamping sections.

Note that if the second clamping section B of the coil spring 14, which is previously wound to have a torsion slightly less than the prescribed operating torque, is attached between the limit piece 18 and a stopper 20 (see FIG. 11), the torque quickly reaches the prescribed value upon rotation of first rotor 10.

Figure 11:
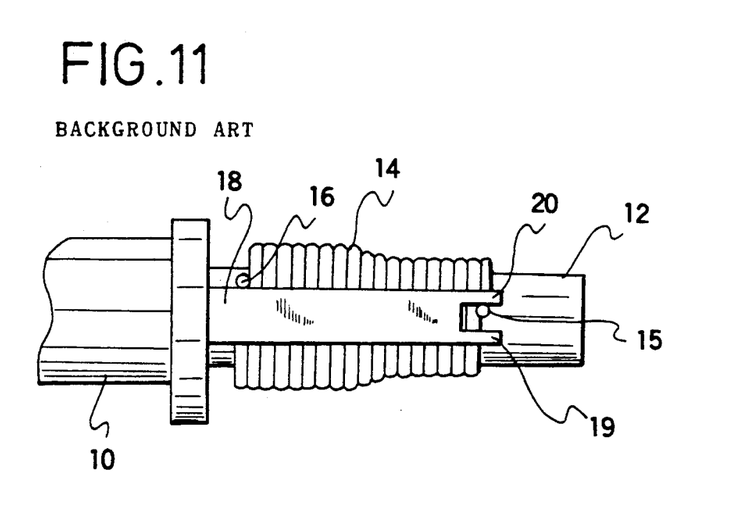
FIG. 11 is an explanatory view of another conventional fixed spring clutch.

In the fixed torque spring clutch shown in FIGS. 10 and 11, the torque can be freely defined by selecting the spring characteristics of the second clamping section B.

However, the fixed torque spring clutch has following disadvantages:

(1) The friction caused by slippage of the shaft section 12 in the first clamping section A creates heat and the frictional coefficient $\mu$ consequently changes, so that the torque gradually rises during operation.

(2) The clamping force of the first clamping section A is lost with operation due to abrasion caused by said slippage.

SUMMARY OF THE INVENTION

An object of the present invention is to provide a fixed torque spring clutch, which is inexpensive, capable of transmitting very stable torque and has high durability.

To achieve the object, the fixed spring clutch of the present invention comprises:
a first rotor;
a second rotor being coaxial to the first rotor;
a shaft section being provided to one of the rotors;
a plurality of catch sections being provided to the other rotor; and
a coil spring being provided over the shaft section, the both ends of the coil spring being retained by the catch sections in clamping status thereof, the coil spring having a first clamping section for clamping the shaft section with prescribed clamping force when the coil spring is provided over the shaft section, and a second clamping section whose inner diameter is larger than the diameter of the corresponding part of the shaft section when the coil spring is provided thereover.

As another structure, the clutch may comprise:
a first rotor;
a second rotor being coaxial to the first rotor;
a hollow cylindrical shaft section being provided to one of the rotors;
a plurality of catch sections being provided to the other rotor; and
a coil spring being provided in the shaft section, the both ends of said coil spring being caught by the catch sections in diameter enlargement status thereof, the coil spring having a first clamping section for elastically contacting the inner face of the shaft section when the coil spring is provided in the shaft section, and a second clamping section whose outer diameter is smaller than the inner diameter of the corresponding part of the shaft section when the coil spring is provided therein.

The wire forming the coil spring preferrably has, in section, a flat face which faces either the outer circumferential or inner face of the shaft section.

Furthermore, the spring clutch of the present invention can be applied to a power transmission mechanism of a winder for winding a tape, a string, a wire, etc. around a reel.

In the present invention, fixed torque spring clutches which are inexpensive, which are capable of transmitting very stable torque and which have long lives can be provided.

BRIEF DESCRIPTION OF THE DRAWINGS

The present invention will be apparent from the following description, reference being had to the accompanying drawings wherein preferred embodiments of the present invention are clearly shown.

In the drawings.

DETAILED DESCRIPTION OF THE PREFERRED EMBODIMENTS

Preferred embodiments of the present invention will now be described in detail with reference to accompanying drawings.

Figure 1:
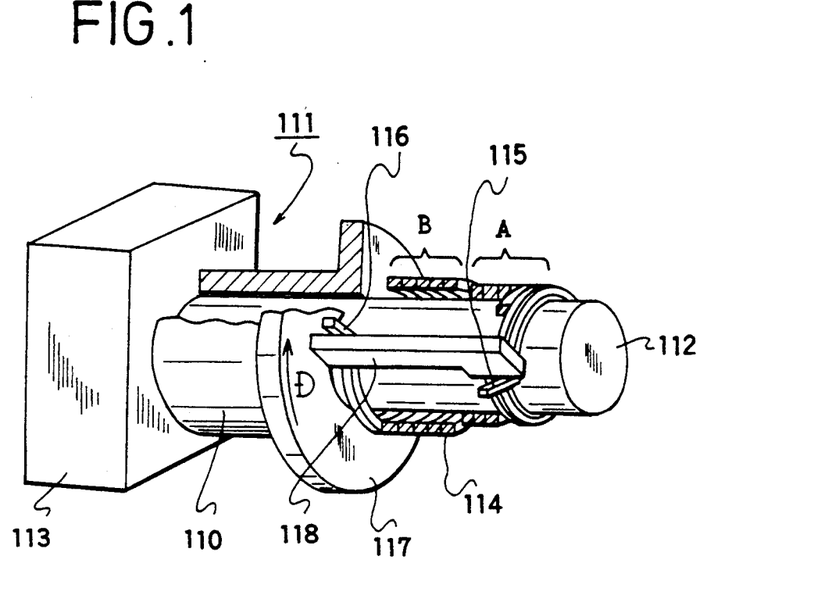
FIG. 1 shows a perspective view, with portions broken away for clarity, of an embodiment of the present invention.

FIG. 1 is a perspective view, with portions broken away for clarity, of the present embodiment.

In FIG. 1, part 110 is a first rotor and part 111 is a second rotor. The rotor 111 has a shaft section 112. To simplify the explanations, the shaft section 112 is fixed to part 113 which represents a driven member (not depicted.)

A coil spring 114 is wound around the outer circumferential face of the shaft section 112. The coil spring 114 has a first clamping section A, which clamps the outer circumferential face of the shaft section 112, and a second clamping section B, which is adjacent to the first clamping section A. There is a clearance between the outer circumferential face of the shaft section 112 and the inner face of the second clamping section B. The both ends of the coil spring 114 are bent outward as engage pieces 115 and 116. The wire forming the coil spring 114 has, in section, a flat face which faces the outer circumferential face of the shaft section 112. By forming the flat face, the inner face of the coil spring 114 is capable of having a maximized contact area with the outer circumferential face of the shaft section 112, so that the clamping pressure of the coil spring 114 can be reduced and the abrasion of the coil spring and the shaft section 112 can be minimized. Note that, the sectional shape of the coil spring 114 need not be rectangular; any other cross-sectional shape having a flat face which faces the outer circumferential face of the shaft section 112 can be allowed. Furthermore, the whole coil spring 114 need not have the flat face in section; the flat face may be formed in at least the part corresponding to the first clamping section A, which always clamps the shaft section 112. In cases where the effects of abrasion can be ignored, the sectional shape of the coil spring 114 can, of course, be circular.

The first rotor 110 has a cylindrical shape and rotatably covers over the shaft section 112. The first rotor 110 has a flange 117. The first rotor 110 is rotated by a driving means such as a motor (not shown.)

An engage section 118 is provided on the end face of the flange 117. The engage pieces 115 and 116 elastically contact respectively opposite sides of the engage section 118. The coil spring 114 is previously wound to have prescribed clamping force and is positioned about the shaft section 112.

Figure 2:
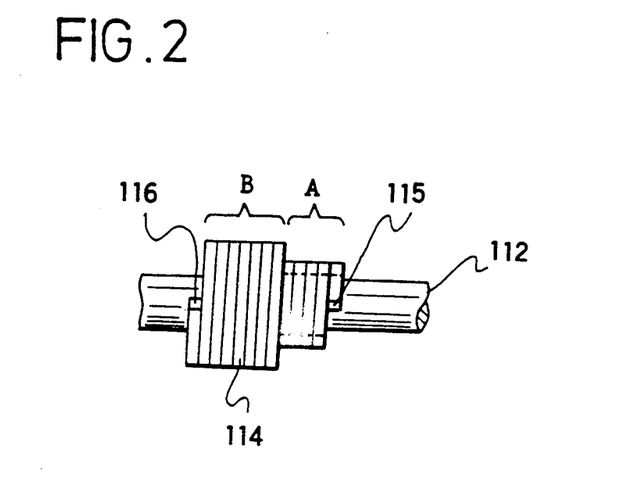
FIG. 2 is an explanatory view of a coil spring prior to attachment to a shaft section.

In this embodiment, the inner diameter of the first clamping section A is larger than the diameter of the shaft section 112 in non-clamping status (see FIG. 2). Upon assembly the coil spring 114 is wound to have prescribed torsion and the engage pieces 115 and 116 elastically contact the engage section 118, resulting in contact between the clamping section A and the shaft 112. Summarily, the first clamping section A is initially set on the shaft section 112 with the prescribed clamping force.

Successively, the action of the spring clutch will be explained.

Rotating the first rotor 110 in the direction D, the engage section 118 presses the engage piece 116 to wind the coil spring 114. A torque T1 transmitted from the engage section 118 to the engage piece 116 is much greater than the force of friction between the first clamping section A and the shaft section 112, so that the coil spring 114 rotates together with the first rotor 110 because the engage piece 115 has elastically contacted the engage section 118. Namely, the first clamping section A slips on the shaft section 112, and a predetermined torque is generated between the first rotor 110 and the second rotor 111. A force T2, which elastically presses the engage piece 115 to the engage section 118, acts to reduce the torque from the first rotor 110 to the second rotor 111. Thus, the torque T from the first rotor 110 to the second rotor 111 will be defined as $T = T1 - T2$ on the condition that the number of spring windings of the first clamping section A is 3 to 5, so that the torque T is independent of the frictional coefficient $\mu$. Friction is naturally generated between the first clamping section A and the shaft section 112, and the frictional coefficient $\mu$ increases. However, the torque T is defined by T1 and T2 (T1 - T2) or the initial clamping force of the coil spring 112, so that the prescribed level of torque can be maintained without regard to changes of the frictional coefficient $\mu$.

In the fixed torque spring clutch shown in FIG. 10, the friction caused by the rotational slippage creates heat and the frictional coefficient $\mu$ changes, so that the torque generated by release piece 19, which works to loosen the first clamping section A, gradually rises. The characteristics of the fixed torque spring clutch of this embodiment and the conventional fixed torque spring clutch as shown in FIG. 10 are shown in FIG. 3.

Figure 3:
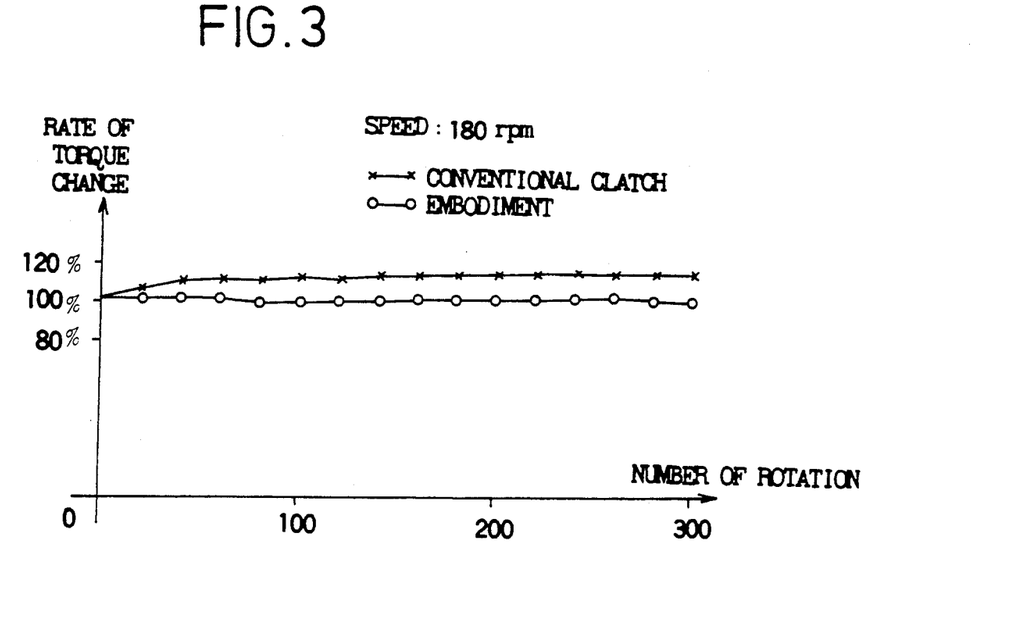
FIG. 3 shows a graph of torque characteristics of both conventional spring clutches and an embodiment of the present invention.

In FIG. 3, the torque scarcely changes in the spring clutch of this embodiment; the torque rises 15% within 300 turns (rotational speed: 180 rpm) in the conventional spring clutch. In the conventional spring clutch, the release piece 19 releases the clamping force in the opposite direction of the windings of the first clamping section A, so that slippage is apt to occur and the slippage causes minute torque changes. On the other hand, in the present embodiment, the engage pieces 115 and 116 elastically contact the engage section 118 during rotation, so that the slippage and minute torque changes do not occur at all, and the rotation is transmitted smoothly.

Figure 4:
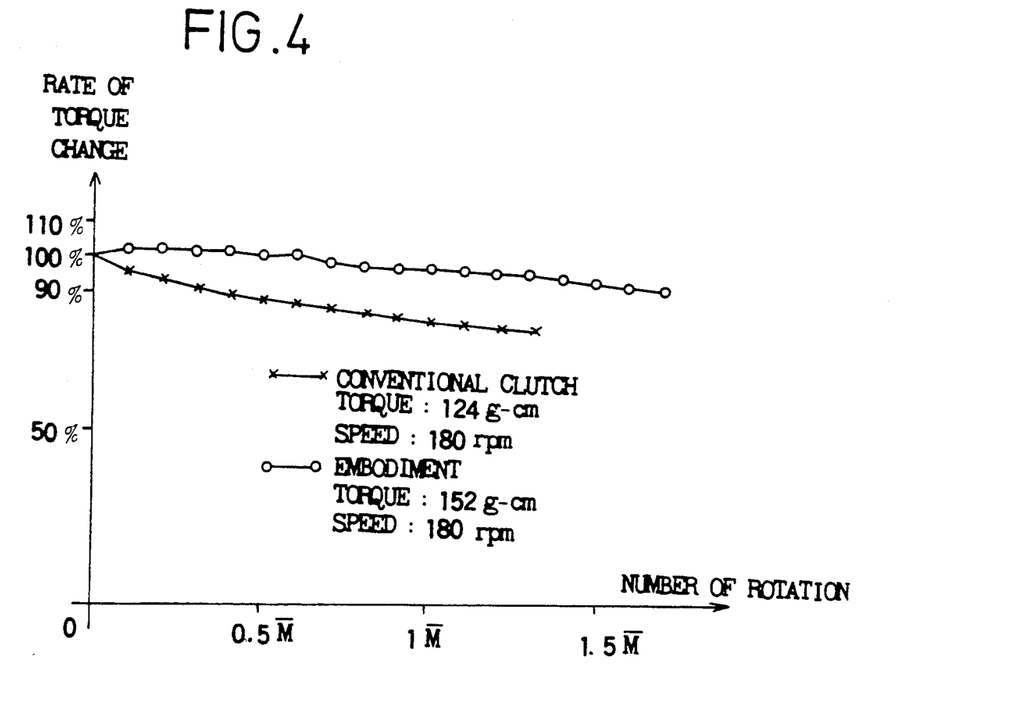
FIG. 4 shows a graph of the relationship between rate of torque change and number of rotations.

Next, FIG. 4 shows a graph of a relationship between characteristics of torque change and number of rotations. As clearly shown in FIG. 4, the torque of this embodiment scarcely changes in spite of its greater torque and higher speed in comparison to the conventional spring clutch. The spring clutch of this embodiment is also advantageous in its durability.

The relationship between the life span of spring clutches and the torque change relates to loss of clamping force in the first clamping section, which is caused by abrasion between the first clamping section and the shaft section. In the case of the conventional spring clutch, racing torque T is almost entirely defined as $T=T1+T2$ (T1: designed torque of the second clamping section B, T2: clamping torque at the end of the first clamping section A), so that T1 and T2 fall in proportion to the torque reduction of the first clamping section A caused by abrasion. Applying this theory, the racing torque T falls quickly. Meanwhile, in the present embodiment, the racing torque T is defined as $T=T1-T2$; if both T1 and T2 fall, the difference (T1−T2) is quite minimal, so that the rate of the torque change remains low.

Furthermore, in the conventional spring clutch, considering the distribution of the clamping force of the first clamping section A with respect to the shaft section 12, the clamping force at the distal end of the second clamping section B is greater because of its inherent clamping force; the clamping force at the distal end of first clamping section A side is almost zero because of the function of the release piece 19. Thus, the abrasion between the coil spring 14 and the shaft section 12 is concentrated on the second clamping section B side of the first clamping section A. On the other hand, in this embodiment, the whole of the first clamping section A has a calculated uniform clamping force, so that the clamping force is not concentrated and the abrasion is both suppressed and evenly distributed. For this reason, the spring clutch of this embodiment has a long life.

Note that, the shaft section 112 may be rotatable and transmit its torque to the first rotor 110.

In the present embodiment, the inner diameter of the second clamping section B of the coil spring 114 is larger than the inner diameter first clamping section A thereof. The first and the second clamping sections A and B, though, may have the same inner diameter, in which case the part of the shaft section 112 which corresponds to the second clamping section B has a correspondingly smaller diameter so as to form a clearance between the outer circumferential face of the shaft section 112 and the inner face of the second clamping section B. The coil spring 114 may have the first clamping section A in the center and the second clamping sections B at both ends. In the non-clamping status, the first clamping section is not always required to rotate the shaft section 112; the first clamping section A is capable of rotating together with the second clamping section B. In this case, when engage section 118 imparts torque to the second clamping section B, the first clamping section A instantaneously rotates the shaft 112.

Figures 5, 7:
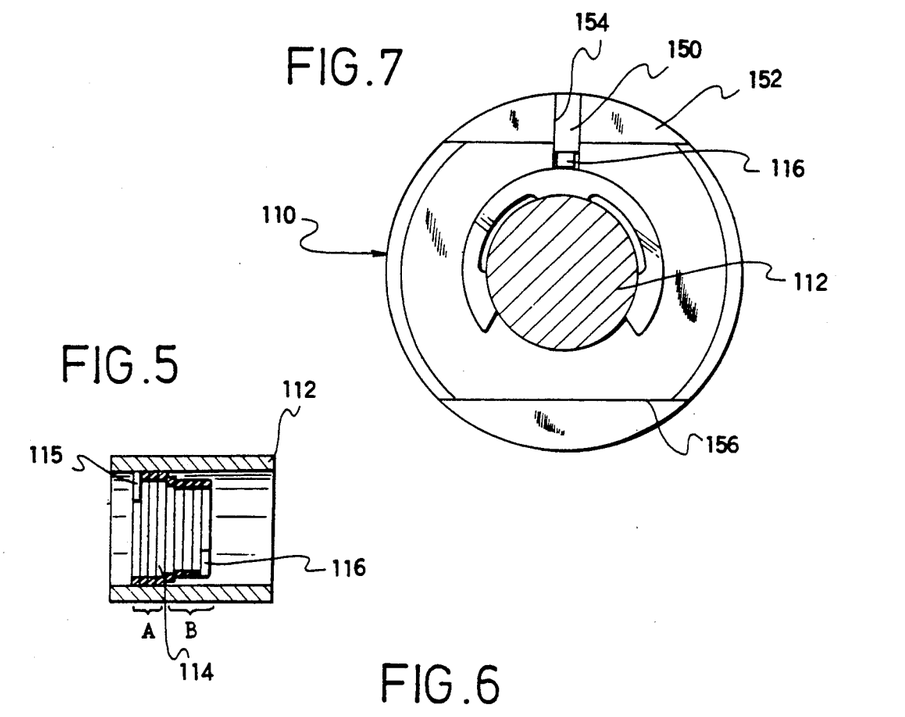
FIG. 5 is a sectional view of another embodiment in which a shaft section has a cylindrical shape and a coil spring is provided therein.
FIG. 7 is a left side view of the embodiment shown in FIG. 6.

Furthermore, as shown in FIG. 5, a shaft section 112 may be formed as a cylinder. And a coil spring 114, which has a first clamping section A with large diameter and a second clamping section B with small diameter, is fitted into an inner space of a shaft section 112. In this embodiment, before a coil spring 114 is fitted into the shaft section 112, the outer diameter of the first clamping section A is smaller than the inner diameter of the shaft section 112. When the coil spring 114 is fitted into the shaft section 112, the diameter of the coil spring 114 is enlarged to have the first clamping section A elastically contact the inner face of the shaft section 112, and engage pieces 115 and 116 elastically contact an engage section (not shown). In this structure, functioning is the same as with the former embodiment.

Figure 6:
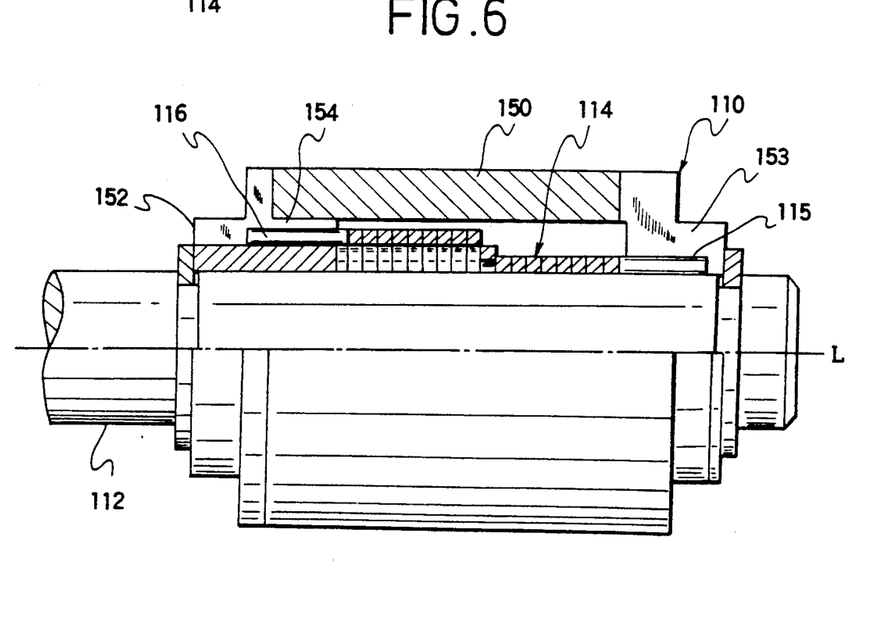
FIG. 6 is a partially sectioned front view of another embodiment having a means for adjusting torque.

Next, another embodiment having means for adjusting the torque will be explained with reference to FIG. 6 (a partially cutaway front view) and FIG. 7 (a left side view).

A first rotor 110 has a cylindrical shape and is rotatably mounted on a shaft section 112. The first rotor 110 has a cylindrical section 150 and a fitted section 152, which is fitted into a left side opening. There is formed a slot 154 in the fitted section 152, which extends in the axial direction L. An engage piece 116 of a coil spring 114 is inserted into and caught in the slot 154. Another engage piece 115 of the coil spring 114 is inserted into and caught in a slot which is formed in a ring 153 fixed to the right side end of the cylindrical section 150 and which also extends in the axial direction L.

To adjust the torque characteristics, the rotational angle of the fitted section 152 with respect to the cylindrical section 150 or the rotational angle of the fitted section 152 with respect of the axial line L can be adjusted. With this adjustment, the clamping force of the coil spring 114, especially the clamping force of the first clamping section A with respect to the shaft section 112, can be varied so that the torque characteristics of each spring clutch can be adjusted. In this embodiment, the cylindrical section 150 and the fitted section 152 are made of plastics, e.g. ABS resin. The fitted section 152 is press-fitted into the cylindrical section 150, and the engage piece 116 of the coil spring 114 is inserted into the slot 154 of the fitted section 152. The rotational angle of the fitted section 152 with respect to the cylindrical section 150 is adjusted until the prescribed torque characteristics are attained. Then, a solvent, e.g. methyl ethyl ketone, is applied to the sections 150 and 152 so as to weld them together. Note that there is formed an oval projection 156 to which tools can be applied on the left end face of the fitted section 152.

Figure 8:
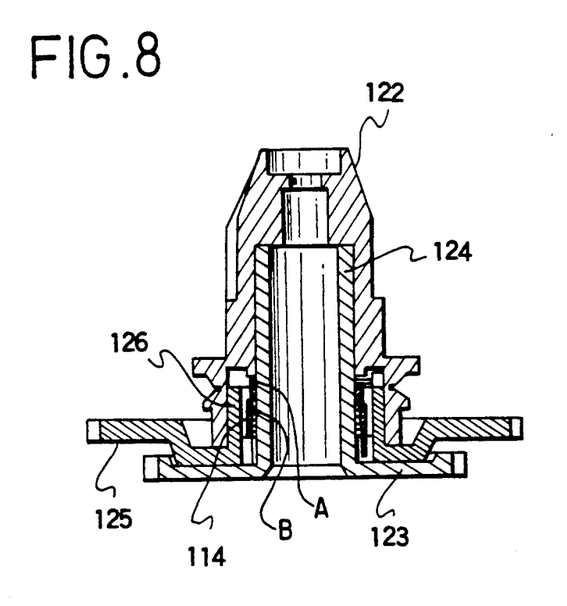
FIG. 8 is a sectional view of a reel having the fixed torque spring clutch of the present invention.
Figure 9:
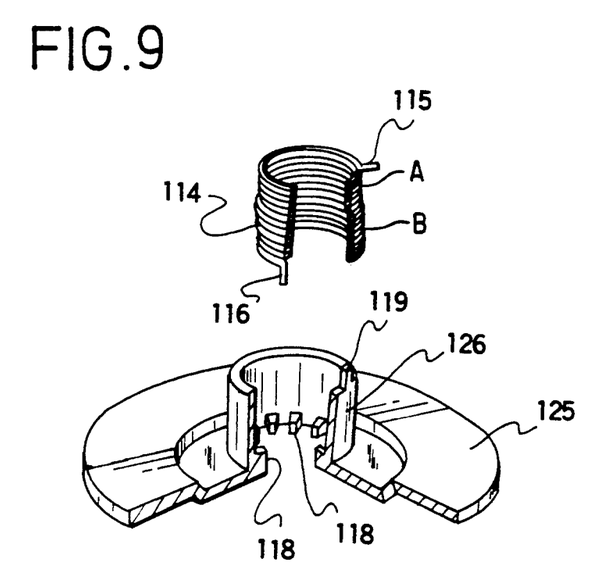
FIG. 9 is an exploded perspective view of the main part of the reel shown in FIG. 8.

A reel for a cassette tape recorder, which has the fixed torque spring clutch of the present invention, will be explained with reference to FIGS. 8 and 9.

A rotary cylinder 124, which is projected upward on an upper face of a fast forward gear 123, is press-fitted into a cap-reel 122. The cap-reel 122 is the second rotor, and a fixed axle (not shown) is fitted into the rotary cylinder 124.

Driving force from a motor (not shown), which is mounted within a recorder proper (not shown), is transmitted to a gear 125. A cylindrical section 126, which is projected upward in the center section of the gear 125, is rotatably fitted in a space between the outer circumferential face of the rotary cylinder 124 and the lower inner face of the cap-reel 122. With this structure, the cylindrical section 126 can be rotated on the rotary cylinder 124.

A coil spring 114 is positioned coaxially about rotary cylinder 124. A first clamping section A constantly clamps the rotary cylinder 124. An engage piece 115 of the first clamping section A can elastically contact an engage section 119; an engage piece 116 of a second clamping section B can elastically contact a plurality of engage sections 118, which are formed on the inner face of the cylindrical section 126 (see FIG. 9). Therefore, when the gear 125 is rotated by the motor in the recorder proper, driving force is transmitted to the cap-reel 122 by the engage sections 118 and 119 and the coil spring 114 so as to rotate the cap-reel 122, so that a reel (not shown) in a cassette is rotated and a tape (not shown) is wound around the reel in the cassette. During the rotation of the cap-reel 122, the cap-reel 122 is, as described above, rotated with fixed torque so that the tape is wound around the reel in the cassette with fixed tension.

The torque of the second clamping section B can be easily adjusted by selecting one of the engage sections 118, which engages the engage piece 116. In this case, it is preferable to bore through-holes (not shown), which correspond to the engage sections 118, in the gear 123. With these through-holes, changing the selected engage section 118, which engages the engage piece 116, can be easily executed via the through-holes even if the reel has been assembled on the recorder proper.

The example of the reel in the cassette tape recorder has been explained above but the fixed torque spring clutch can be applied to power transmission mechanisms of many kinds of winders, which wind tapes, strings, wires, etc. around reels.

Preferred embodiments of the present invention have been described in detail but the present invention is not limited to the above described embodiments and modifications can be allowed without deviating from the scope of the invention.

What is claimed is:

1. A fixed torque spring clutch comprising:
   a first rotor;
   a second rotor coaxial with said first rotor;
   a shaft section on one of said rotors;
   a plurality of catch sections on the other rotor; and
   a coil spring covering said shaft section, said coil spring having a first end engaging one of said catch sections and a second end engaging another of said catch sections, to define a first state of said coil in which said coil has a diameter that is less than the diameter thereof in the absence of engagement of said first and second ends and catch sections, said coil spring being divided into a first clamping section which clamps said shaft section with a predetermined force in the first state, and a second clamping section which has a clearance with respect to said shaft section in said first state,
   whereby the torque T transmitted between said rotors via said coil spring, is equal to $T_1 - T_2$, wherein $T_1$ is an elastic force between said one catch section and said first end of said coil spring and $T_2$ is an elastic force between said another catch section and said second end of said coil spring, when one of said rotors is rotated with respect to the other of said rotors.

2. The fixed torque spring clutch according to claim 1, wherein the cross section of the wire forming said coil spring has a flat face, and said flat face is directed toward the outer circumferential face of said shaft section.

3. The fixed torque spring clutch according to claim 1, wherein the inner diameters of said first and second clamping sections of said coil spring are larger than the diameter of said shaft section before said coil spring covers said shaft section.

4. The fixed torque spring clutch according to claim 3, wherein the cross section of the wire forming said coil spring has a flat face, and said flat face is directed toward the outer circumferential face of said shaft section.

5. A fixed torque spring clutch comprising:
   a first rotor;
   a second rotor coaxial with said first rotor;
   a hollow cylindrical shaft section on one of said rotors;
   first and second catch sections on the other rotor; and
   a coil spring positioned in said shaft section, said coil spring having a first end engaging one of said catch sections and a second end engaging another of said catch sections, to define a first state of said coil in which said coil has a diameter that is greater than the diameter thereof in the absence of engagement of said first and second ends and catch sections, said coil spring being divided into a first clamping section which elastically clamps the inner face of said shaft section in said first state, and a second clamping section which has a clearance with respect to said shaft section in said first state.
   whereby the torque T transmitted between said rotors via said coil spring, is equal to $T_1 - T_2$, wherein $T_1$ is an elastic force between said first catch section and said first end of said coil spring and $T_2$ is an elastic force between said second catch section and said second end of said coil spring, when one of said rotors is rotated with respect to the other of said rotors.

6. The fixed torque spring clutch according to claim 5 wherein the cross section of the wire forming said coil spring has a flat face, and said flat face is directed toward the inner face of said shaft section.

7. The fixed torque spring clutch according to claim 5, wherein the outer diameters of said first and second clamping sections of said coil spring are smaller than the diameter of said shaft section before said coil spring is provided in said shaft section.

8. The fixed torque spring clutch according to claim 7 wherein the cross section of the wire forming said coil spring has a flat face, and said flat face is directed toward the inner face of said shaft section.

9. A winder having a reel for winding a tape, a string, or a wire, and means for driving the reel, comprising:
   a first rotor;
   a second rotor coaxial with said first rotor;
   said reel being coupled to one of said rotors;
   a shaft section on one of said rotors;
   a plurality of catch sections on the other rotor; and
   a coil spring covering said shaft section, said coil spring having a first end engaging one of said catch sections and a second end engaging another of said catch sections, to define a first state of said coil in which said coil has a diameter that is less than the diameter thereof in the absence of engagement of said first and second ends and catch sections, said coil spring being divided into a first clamping section which clamps said shaft section with a predetermined force in the first state , and a second clamping section which has a clearance with respect to said shaft section in said first state,
   whereby the torque T transmitted between said rotors via said coil spring, is equal to $T_1 - T_2$, wherein $T_1$ is an elastic force between said one catch section and said first end of said coil spring and $T_2$ is an elastic force between said another catch section and said second end of said coil spring, when one of said rotors is rotated with respect to the other of said rotors.

10. The winder according to claim 9, wherein the cross section of the wire forming said coil spring has a flat face, and said flat face is directed toward the outer circumferential face of said shaft section.

11. The winder according to claim 9, wherein the inner diameter of said first and second clamping sections of said coil spring are larger than the diameter of said shaft section before said coil spring is provided over said shaft section.

12. The winder according to claim 11, wherein the cross section of the wire forming said coil spring has a flat face, and said flat face is directed toward the outer circumferential face of said shaft section.

13. A winder having a reel for winding a tape, a string, or a wire and means for driving the reel, comprising:

a first rotor;

a second rotor coaxial with said first rotor;

said reel being coupled to one of said rotors;

a hollow cylindrical shaft section on one of said rotors;

first and second catch sections on the other rotor; and a coil spring positioned in said shaft section, said coil spring having a first end engaging one of said catch sections and a second end engaging another of said catch sections, to define a first state of said coil in which said coil has a diameter that is greater than the diameter thereof in the absence of engagement of said first and second ends and catch sections, said coil spring being divided into a first clamping section which elastically clamps the inner face of said shaft section in said first state, and a second clamping section which has a clearance with respect to said shaft section in said first state whereby the torque T transmitted between said rotors via said coil spring, is equal to $T1 - T2$, wherein T1 is an elastic force between said first catch section and said first end of said coil spring and T2 is an elastic force between said second catch section and said second end of said coil spring, when one of said rotors is rotated with respect to the other of said rotors.

14. The winder according to claim 13 wherein the cross section of the wire forming said coil spring has a flat face, and said flat face is directed toward the inner face of said shaft section.

15. The winder according to claim 13, wherein the outer diameter of said first and second clamping sections of said coil spring is smaller than the inner diameter of said shaft section before said coil spring is provided in said shaft section.

16. The winder according to claim 15, wherein the cross section of the wire forming said coil spring has a flat face, and said flat face is directed toward the inner face of said shaft section.

* * * * *